US 6,565,217 B2
(12) United States Patent
Laroche et al.

(10) Patent No.: US 6,565,217 B2
(45) Date of Patent: May 20, 2003

(54) SILVER COATED MIRROR

(75) Inventors: Pierre Laroche, Nalinnes (BE); Pierre Boulanger, Couthuin (BE); Christian Dauby, Gerpinnes (BE)

(73) Assignee: Glaverbel, Jumet (BE)

( * ) Notice: Subject to any disclaimer, the term of this patent is extended or adjusted under 35 U.S.C. 154(b) by 0 days.

(21) Appl. No.: 09/835,590

(22) Filed: Apr. 17, 2001

(65) Prior Publication Data

US 2001/0033935 A1 Oct. 25, 2001

Related U.S. Application Data

(62) Division of application No. 08/907,970, filed on Aug. 11, 1997, now Pat. No. 6,251,482, which is a continuation of application No. 08/435,721, filed on May 5, 1995, now abandoned.

(30) Foreign Application Priority Data

May 12, 1994 (GB) ........................ 94 09 538 U

(51) Int. Cl.$^7$ ............................................. G02B 5/08
(52) U.S. Cl. ................... 359/838; 428/912.2
(58) Field of Search .............. 428/687, 912.2; 359/838, 883; 427/165, 168, 304, 404, 409, 421, 426, 443.1, 443.2, 162

(56) References Cited

U.S. PATENT DOCUMENTS

| | | | |
|---|---|---|---|
| 2,702,253 A | 2/1955 | Bergström | 117/47 |
| 2,899,333 A | 8/1959 | Gee et al. | 117/35 |
| 3,011,920 A | * 12/1961 | Shipley, Jr. | 106/1.11 |
| 3,119,709 A | 1/1964 | Atkinson | 117/47 |
| 3,382,087 A | * 5/1968 | Ostrowski | |
| 3,457,138 A | 7/1969 | Miller | 161/196 |
| 3,669,770 A | 6/1972 | Feldstein | 156/3 |
| 3,671,291 A | 6/1972 | Miller | 117/54 |
| 3,672,939 A | * 6/1972 | Miller | 427/168 |
| 3,776,740 A | 12/1973 | Sivertz et al. | 106/1 |

(List continued on next page.)

FOREIGN PATENT DOCUMENTS

| | | | |
|---|---|---|---|
| AU | 27 45 45 | 7/1964 | |
| CA | 2004429 | 6/1990 | |
| DE | 1915252 | 10/1969 | ............ C23C/3/02 |
| DE | 21 36 348 | 10/1975 | |
| EP | 2112182 | 6/1972 | |

(List continued on next page.)

OTHER PUBLICATIONS

"Ullmann's Encyklopädie dir technishen Chemie", 4ed., vol. 21, pp: 633–6.

ASTM Designation: B 368–85, "Standard Method for Copper–Accelerated Acetic Acid–Salt Spray (Fog) Testing (CASS Test)", pp: 136–9, 1990.

(List continued on next page.)

Primary Examiner—John Juba, Jr.
(74) Attorney, Agent, or Firm—Piper Rudnick LLP; Jerold I. Schneider

(57) ABSTRACT

A mirror composed of a vitreous substrate having a silver coating formed on a surface thereof produced by a process including the steps of sensitizing the vitreous substrate; activating the vitreous substrate by contacting the vitreous substrate with a solution comprised of at least one ion selected from the group consisting of bismuth (III), chromium (II), gold (III), indium (III), nickel (II), palladium (II), platinum (II), rhodium (III), titanium (III), vanadium (III) and zinc (II); contacting the vitreous substrate with a silvering solution so as to form the silver coating; and applying at least one layer of paint over the silvered substrate. Preferably, the silver coating is not covered with a protective layer of copper.

32 Claims, 1 Drawing Sheet

U.S. PATENT DOCUMENTS

| | | | | |
|---|---|---|---|---|
| 3,798,050 | A | | 3/1974 | Franz et al. ............... 427/304 |
| 3,846,152 | A | * 11/1974 | | Franz ........................ 148/240 |
| 3,978,271 | A | | 8/1976 | Greenberg ................. 428/433 |
| 4,005,229 | A | | 1/1977 | Miller ....................... 427/304 |
| 4,285,992 | A | | 8/1981 | Buckwalter, Jr. ........... 427/165 |
| 4,379,184 | A | | 4/1983 | Tsvetkov et al. ........... 427/169 |
| 4,643,918 | A | | 2/1987 | Orban ....................... 427/304 |
| 4,780,372 | A | * 10/1988 | | Tracy et al. ................ 359/883 |
| 4,880,668 | A | * 11/1989 | | Hayes et al. ............... 427/162 |
| 5,240,776 | A | | 8/1993 | Servais et al. ............. 428/434 |
| 5,296,297 | A | | 3/1994 | Servais et al. ............. 428/426 |
| 5,374,451 | A | | 12/1994 | Servais et al. ............. 427/165 |

FOREIGN PATENT DOCUMENTS

| | | | |
|---|---|---|---|
| GB | 1094318 | 12/1967 | ............ C23C/3/00 |
| GB | 1237032 | 3/1969 | |
| GB | 1339829 | 12/1973 | ............ C23C/3/02 |
| GB | 2227432 | 1/1990 | |
| GB | 2252568 | 8/1992 | ........... C23C/18/44 |
| GB | 2254339 A | 10/1992 | ........... C23C/18/44 |
| JP | 39-29941 | 12/1964 | |
| JP | 63-020486 A | 1/1988 | ........... C23C/18/40 |
| JP | 05-287543 | 2/1993 | ........... C23C/18/44 |
| JP | 6-38860 A | * 2/1994 | |

OTHER PUBLICATIONS

ISO 9227:1990(E), "Corrosion tests in artificial atmospheres—Salt spray tests," pp:ii–iii and pp: 1–9.

Metal Finishing, Jan., 1993, vol. 91, No. 1A, "$61^{st}$ Guidebook and Dictionary Issue," including Table of Contents and $1^{st}$ page of each article, excluding the article previously submitted.

Charles Davidoff, "Metallizing Nonconductors", Metal Finishing, 61st Guidebook and Director Issue, vol. 91, No. 1A, pp. 322–328, Jan. 1993.

Shoten, Asakura, "Electroless Plating," $3^{rd}$. Ed., Apr. 25, 1971, p. 64 (translation).

de Minger, C.H., et al., "The Nucleation with $SnCl_2$—$PdCl_2$ Solutions of Glass Before Electroless Plating", *J. Electrochem Soc., Electrochemical Science and Technology*, vol. 120, No. 12, Dec., 1973, pp. 1644–1650.

Database WPI, Week 28, Derwent Publication Ltd., London, Great Britain, AN 85–167819 and JP–A–60 096 548 (Nippon Chem Ind KK), May 30, 1985.

"Engineering Review of Coating," *New Surface Treatment Technology Review*, Published by T. Hirano at K.K. Industrial Technology Service Centre, Tokyo–to, Japan, Oct. 10, 1989, pp. 225 & 226 (translation).

Kuznetsov, A. Ya, et al. "Methods of Improving the Adhesion of Metallic Silver Films to the Surface of Glass and Quartz," *Sov. J. Opt. Technol.*, vol. 42, No. 10, pp. 604 and 605), English language publication of a Russian language article. Oct. 1975.

* cited by examiner

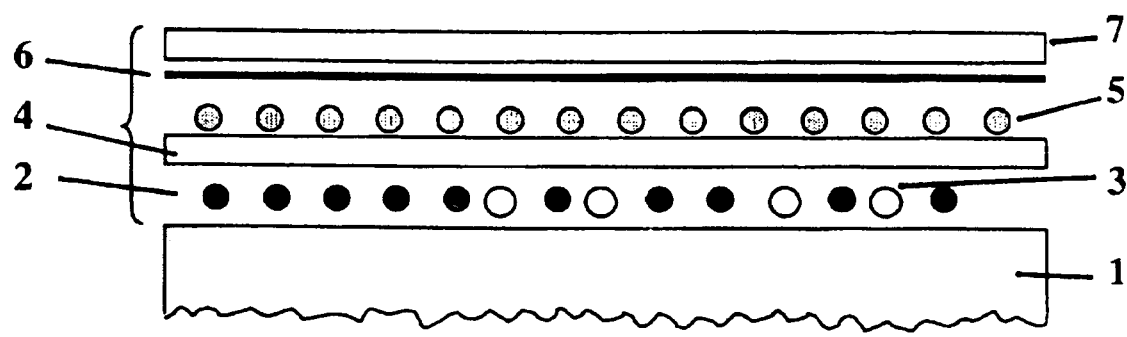
FIG.

SILVER COATED MIRROR

This application is a Division of Ser. No. 08/907970 filed Aug. 11, 1997 now U.S. Pat. No. 6,251,482 which is a Continuation of Ser. No. 08/435,721 filed May 5, 1995 now ABN.

BACKGROUND OF THE INVENTION

1. Field of the Invention

This invention relates to a process for forming a silver coating on a surface of a vitreous substrate, in particular to the silvering of glass, that is to say the chemical deposition of a coating of silver, using a silvering solution.

Such a metal coating may be deposited pattern-wise to form a decorative article, but the invention has particular reference to glass substrates bearing a continuous reflective coating. The coating may be applied to a substrate of any form, for example to an artistic object, to achieve some desired decorative effect, but it is envisaged that the invention will find greatest use when the coating is applied to a flat glass substrate. The reflective coating may be so thin that it is transparent. Glass panes bearing transparent reflective coatings are useful inter alia as solar screening panels or as low-emissivity (in respect of infra-red radiation) panels. Alternatively, the coating may be fully reflective, thus forming a mirror-coating. Such a process is also used for the formation of silvered glass microbeads (that is to say microbeads carrying a coating of silver), which may for example be incorporated in a plastics material matrix to form a reflective road-marking paint or a conductive plastics material.

2. Description of the Related Art

Conventionally, silver mirrors are produced as follows. The glass is first of all polished and then sensitised, typically using an aqueous solution of $SnCl_2$. After rinsing, the surface of the glass is usually activated by means of an ammoniacal silver nitrate treatment. The silvering solution is then applied in order to form an opaque coating of silver. This silver coating is then covered with a protective layer of copper and then one or more coats of paint in order to produce the finished mirror.

The silver coating does not always adhere sufficiently to the substrate. In the case of certain prior products, it has been observed that the silver coating comes away spontaneously from the glass substrate. This is, for example, the case when silvered microbeads manufactured in a normal manner are incorporated in a plastics matrix.

SUMMARY OF THE INVENTION

The aim of the invention is to improve the adhesion of such a silver coating to the glass and thus to improve the durability of this silver coating.

According to a first aspect of the invention, there is provided a process for forming a silver coating on a surface of a vitreous substrate, comprising an activating step in which said surface is contacted with an activating solution, a sensitising step in which said surface is contacted with a sensitising solution, and a subsequent silvering step in which said surface is contacted with a silvering solution comprising a source of silver to form the silver coating, characterised in that said activating solution comprises ions of at least one of bismuth (III), chromium (II), gold (III), indium (III), nickel (II), palladium (II), platinum (II), rhodium (III), ruthenium (III), titanium (III), vanadium (III) and zinc The characteristic of the invention therefore is to "activate" the substrate by treating it with a specific activating solution before silvering.

It has been observed that the treatment of glass using an activating solution according to the present invention improves the adhesion of the silver coating.

The sensitising step contributes to improving the adherence of the silver coating and therefore its durability. Preferably the sensitising step is carried out before said silvering step. This sensitising step is typically carried out with a sensitising solution comprising tin (II) chloride.

Preferably, said sensitising step is carried out prior to the activating step. We have observed that the order of the steps is important to obtain good durability. This observation is very surprising because the activation treatment does not really produce a distinct continuous layer containing bismuth (III), chromium (II), gold (III), indium (III), nickel (II), palladium (II), platinum (II), rhodium (III), ruthenium (III), titanium (III), vanadium (III) or zinc (II), but they are in the form of islets on the surface of the glass. An analysis of the surface of glass treated with a sensitising solution containing tin (II) chloride followed by an activating solution containing palladium (II) shows the presence of a certain proportion of palladium atoms with respect to tin atoms at the glass surface. Typically, one finds about 0.4 atoms of palladium per atom of tin, and 0.3 atoms of tin per atom of Si at the surface of the glass.

The activation treatment according to the invention may be effected on various types of vitreous substrates, for example on glass microbeads. It has been observed that the treatment according to the invention improves the adhesion of the silver coating subsequently deposited on the glass microbeads. When such silvered microbeads are incorporated in a plastic, it is found that the coating of silver has less of a tendency to peel away from the bead than if the activation treatment according to the invention is omitted. The invention can also be implemented on flat glass substrates, and it is believed that the invention will be particularly useful for this type of substrate. Consequently, the treatment is preferably effected on a flat glass substrate, such as a glass sheet.

The layer of silver may be deposited in the form of a silver coating which is fairly thin so that it is transparent. Flat glass substrates carrying such transparent coatings are used to form glazing panels which reduce the emission of infrared radiation and/or which protect from solar radiation. Thus according to one embodiment of the invention the thickness of the layer of silver formed in said silvering step is between 8 nm and 30 nm.

However, the treatment is preferably applied to glass substrates onto which a thick opaque silver coating is subsequently applied in order to form a mirror. Such embodiments of the invention, where the product is a mirror, are used for example as domestic mirrors or as vehicle rear-view mirrors. The invention makes it possible to produce mirrors on which the silver coating has an improved adhesion to the glass. Thus according to another embodiment the thickness of the layer of silver formed in said silvering step is between 70 nm and 100 nm.

According to the present invention, the activation of the glass is effected before silvering by treating the glass substrate with a specified activating solution. It is observed that the silver coating of the mirror produced in this way has better adhesion than that of a mirror manufactured by the conventional process.

The improvement of the adhesion of the silver coating obtained by the process according to the present invention is observed in different ways.

The adhesion of a silver coating to its glass substrate may be assessed quickly by testing using adhesive tape: an adhesive tape is applied to the silver coating and then pulled off. If the silver coating is not adhering well to the glass, it comes away from the glass when the tape is pulled off.

The degree of adhesion of the silver coating to the glass can also be observed by subjecting the product to an accelerated ageing test such as the CASS Test or Salt Fog Test. It is sometimes found that the product subjected to such tests has a certain edge corrosion and/or light diffusing specks ("white specks").

The activation treatment according to the invention affords another advantage. We have observed that the silvering reaction on glass activated according to the invention is more effective, that is to say the reaction yield is greater. It is possible to achieve yields improved by around 15% compared with silvering effected on a glass activated in a conventional manner, with a solution of ammoniacal silver nitrate. This presents advantages from the economic point of view since one can use less reagents to form the same thickness of silver coating and also from the environmental point of view since the quantity of waste from the silvering reaction to be eliminated can be reduced.

It is conventional to protect the silver coating with an overcoating of copper to retard tarnishing of the silver layer. The copper layer is itself protected from abrasion and corrosion by a layer of paint. Those paint formulations which afford the best protection against corrosion of the copper layer contain lead pigments. Unfortunately lead pigments are toxic and their use is being increasingly discourage for reasons of environmental health.

It has recently been proposed to protect the silver coating by treatment with an acidified aqueous solution of Sn (II) salt (see British patent application GB 2252568). According to another recent proposal, the silver coating is protected by treatment with a solution containing at least one of Cr (II), V (II or III), Ti (II or III), Fe (II), In (I or II), Cu (I) and Al (III) (see British patent application GB 2254339). We have observed that the activation treatment according to the present invention is particularly useful for the manufacture of such products. One important application of the protection treatments according to GB 2252568 and GB 2254339 is the formation of silver mirrors which do not include a conventional protective layer of copper. Such mirrors can be protected with lead-free paints. The activation treatment according to the present invention is particularly advantageous for the manufacture of such mirrors. This is because the activation treatment of the glass during the manufacture of mirrors protected with such treatment significantly improves the adhesion of the silver coating of such mirrors and therefore their durability. Consequently, the invention applies preferably to the manufacture of mirrors with no copper layer, and in particular to mirrors formed by a process in which the silver coating is subsequently contacted with a solution containing ions of at least one of the group consisting of Cr (II), V (II or III), Ti (II or III), Fe (II), In (I or II), Sn (II), Cu (I) and Al (III).

The glass substrate may be brought into contact with the activating solution by dipping in a tank containing an activating solution but, preferably, the glass substrate is brought into contact with the activating solution by spraying with a solution containing an activating solution. This is particularly efficacious and practical in the case of flat glass substrates, for example during the industrial manufacture of flat mirrors, in which sheets of glass pass through successive stations where sensitisation, activation and then silvering reagents are sprayed.

We have observed that the glass substrate may be effectively activated by a rapid treatment using the specified activating solution. It has been observed that the glass/activating solution contact time may be very short, for example around a few seconds only. In practice, in the industrial production of flat mirrors, the sheet of glass moves along a mirror production line on which the glass passes through an activation station where the activating solution is sprayed, then through a rinsing station and afterwards through the silvering station.

The activating solution preferably comprises a source of palladium, most preferably a palladium (II) salt in aqueous solution, in particular $PdCl_2$ in acidified aqueous solution.

The activating solution may be used very simply and economically. The $PdCl_2$ solution may have a concentration of from 5 to 130 mg/l. We have observed that bringing the glass substrate into contact with a quantity of from 1 to 23 mg, preferably at least 5 mg of $PdCl_2$, per square meter of glass is entirely sufficient to activate the glass substrate effectively. In fact, we have observed that the use of quantities of $PdCl_2$ higher than about 5 or 6 mg $PdCl_2/m^2$ does not afford any significant improvement. Therefore it is preferred to treat the glass substrate with about 5 or 6 mg of $PdCl_2$ per square meter of glass.

We have found that best results can be obtained when the pH of said activating solution is from 2.0 to 7.0, most preferably from 3.0 to 5.0. This pH range allows solutions to be formed which are both stable and effective for activating the glass. For example, when using palladium, below pH=3.0 the level of palladium deposited on the glass substrate may be reduced, leading to a poor quality product. Above pH=5.0, there is a risk of precipitation of palladium hydroxide.

According to a second aspect of the invention, there is provided a mirror comprising a vitreous substrate carrying a silver coating which is not covered with a protective layer of copper, the mirror exhibiting an average number of white specks of less than 10 per $dm^2$, preferably less than 5 per $dm^2$, after having been subjected to the accelerated ageing CASS Test and/or the Salt Fog Test defined below. Such a silver mirror without a copper layer is advantageous since the silver coating adheres well and has good durability.

The silver coating may be covered with one or more protective paint layers and according to a preferred aspect of this invention such a paint is free, or substantially free, of lead. Where more than one such paint layer is used, the paint layers other than the uppermost paint layer may contain lead. However, for environmental health reasons, lead sulphate and lead carbonate in the lower paint layers are preferably absent so that where lead is present in these lower layers it is preferably in the form of lead oxide.

BRIEF DESCRIPTION OF THE FIGURE

The single FIGURE is a diagrammatic exploded illustration of one embodiment of the invention.

DESCRIPTION OF THE PREFERRED EMBODIMENTS

In the single FIGURE there is a diagrammatic exploded illustration including a vitreous substrate 1, tin 2, which is present as a result, for example, of sensitizing the vitreous substrate with tin (II) chloride, and one or more of palladium, bismuth, chromium, gold, indium, nickel, platinum, rhodium, ruthenium, titanium, vanadium or zinc 3, which is present as a result of the activation of the vitreous substrate. Further illustrated in the FIGURE is a layer of silver 4 and optional chromium, vanadium, iron, indium, tin, copper or aluminum 5 as a result of a passivation step, followed by silane 6 and a layer of paint 7.

The invention will now be further described, purely by way of example, in the following examples.

EXAMPLE 1+CONTROL 1

Mirrors are manufactured on a conventional mirror production line in which sheets of glass are conveyed along a path by a roller conveyor.

The sheets of glass are first of all polished, rinsed and then sensitised by means of a tin chloride solution, in the normal manner, and then rinsed.

An acidic aqueous solution of $PdCl_2$ is then sprayed onto the sheets of glass. This solution is prepared from a starting solution containing 6 g of $PdCl_2/l$ acidified with HCl in order to obtain a pH of approximately 1, and diluted with demineralised water in order to feed spray nozzles which direct the dilute solution, which contains 60 mg $PdCl_2/l$, onto the sheets of glass, so as to spray approximately 11 mg of $PdCl_2/m^2$ of glass.

The sheets of glass thus activated then pass to a rinsing station where demineralised water is sprayed, and then to the silvering station where a traditional silvering solution is sprayed, comprising a silver salt and a reducing agent. This is achieved by simultaneously spraying a solution A containing ammoniacal silver nitrate and heptagluconic acid and a solution B containing ammoniacal sodium hydroxide, The flow rate and concentration of the solutions sprayed onto the glass are controlled so as to form, under conventional production conditions, a layer containing approximately 800–850 mg/m² of silver. It is observed that the mass of silver deposited is higher by approximately 135 mg/m² of silver, ie approximately 935–985 mg/m² of silver.

A coppering solution of a usual composition is sprayed onto the silver coating in order to form a coating containing approximately 300 mg/m² of copper. This is achieved by simultaneously spraying a solution A and a solution B. Solution A is prepared by mixing an ammonia solution with a solution containing copper sulphate and hydroxylamine sulphate. Solution B contains citric acid and sulphuric acid. The glass is then rinsed, dried and covered with a Levis epoxy paint. This paint comprises a first coat of approximately 25 µm of epoxy and a second coat of approximately 30 µm of alkyd. Mirrors are allowed to rest for 5 days to ensure complete curing of the paint layers.

Mirrors manufactured in this manner are subjected to various accelerated ageing tests.

One indication of the resistance to ageing of a mirror incorporating a metallic film can be given by subjecting it to a copper-accelerated acetic acid salt spray test known as the CASS Test in which the mirror is placed in a testing chamber at 50° C. and is subjected to the action of a fog formed by spraying an aqueous solution containing 50 g/l sodium chloride, 0.2 g/l anhydrous cuprous chloride with sufficient glacial acetic acid to bring the pH of the sprayed solution to between 3.0 and 3.1. Full details of this test are set out in International Standard ISO 3770-1976. Mirrors may be subjected to the action of the saline fog for different lengths of time, whereafter the reflective properties of the artificially aged mirror may be compared with the reflective properties of the freshly formed mirror. We find that an exposure time of 120 hours gives a useful indication of the resistance of a mirror to ageing. We perform the CASS Test on 10 cm square mirror tiles, and after exposure to the copper-accelerated acetic acid salt spray for 120 hours, each tile is subjected to microscopic examination. The principal visible evidence of corrosion is a darkening of the silver layer and peeling of the paint around the margins of the mirror. The extent of corrosion is noted at five regularly spaced sites on each of two opposed edges of the tile and the mean of these ten measurements is calculated. One can also measure the maximum corrosion present at the margin of the tile to obtain a result which is again measured in micrometers.

A second indication of the resistance to ageing of a mirror incorporating a metallic film can be given by subjecting it to a Salt Fog Test which consists in subjecting the mirror to the action, in a chamber maintained at 35° C., of a salt fog formed by spraying an aqueous solution containing 50 g/l sodium chloride. We find that an exposure time of 480 hours to the Salt Fog Test gives a useful indication of the resistance of a mirror to ageing. The mirror is again subjected to microscopic examination, and the corrosion present at the margin of the tile is measured to obtain a result in micrometers, in the same way as in the CASS Test.

Mirrors measuring 10 cm square manufactured according to Example 1 are subjected to the CASS and salt fog tests, along with Control samples not according to the invention.

These Control samples are manufactured from sheets of glass as described in Example 1, except that the $PdCl_2$ activation stage followed by a rinsing is omitted. This step is replaced by a traditional activation step, by spraying with an ammoniacal solution of silver nitrate.

The results of the two ageing tests on the mirror of Example 1 and the Control sample 1 are as set out in the following TABLE I:

TABLE I

|  | CASS test average in µm | Salt fog test average in µm | Density of white specks average number/dm² |
|---|---|---|---|
| Example 1 | 334 | 97 | 0 |
| Control 1 | 480 | 153 | 0 |

The mirrors according to Example 1 and Control 1 do not show any white specks after these two tests.

The treatment consisting of the activation of the glass with palladium (II) chloride before silvering according to Example 1 therefore reduced the corrosion at the edges of the mirror, which shows better adhesion of the silver, compared with a mirror on which the glass has been activated in a conventional manner with ammoniacal silver nitrate.

EXAMPLES 2 AND 3 & CONTROLS 2 AND 3

Mirrors according to the invention are manufactured on a conventional mirror production line in which sheets of glass are conveyed along a path by a roller conveyor.

The sheets of glass are first of all polished, rinsed and then sensitised by means of a tin chloride solution, in the usual manner, and then rinsed.

An acidic aqueous solution of $PdCl_2$ is then sprayed onto the sheets of glass. This solution is prepared from a starting solution containing 6 g of $PdCl_2/l$ acidified with HCl in order to obtain a pH of approximately 1, and diluted with demineralised water in order to feed spray nozzles which direct the dilute solution, which contains about 30 mg $PdCl_2/l$, onto the sheets of glass, so as to spray approximately 5.5 mg of $PdCl_2/m^2$ of glass. The contact time of the palladium chloride on the surface of the sensitised glass is approximately 15 seconds.

The sheets of glass thus activated then pass to a rinsing station where demineralised water is sprayed, and then to the silvering station where a traditional silvering solution is sprayed, comprising a silver salt and a reducing agent. The flow rate and concentration of the silvering solution sprayed onto the glass are controlled so as to form, under conventional production conditions, a layer containing approximately 800–850 mg/m$^2$ of silver. It is observed that the mass of silver deposited is higher by approximately 100 mg/m$^2$ of silver, ie approximately 900–950 mg/m$^2$ of silver.

The glass is then rinsed. Directly after the rinsing of the silver coating, a freshly formed acidified solution of tin chloride is sprayed onto the silvered glass sheets moving forward, as described in patent application GB 2252568.

The mirrors are then treated by spraying with a solution containing 0.1% by volume of γ-aminopropyl triethoxysilane (Silane A 1100 from Union Carbide). After rinsing and drying, the mirrors are covered with a Levis paint. This paint comprises a first coat of approximately 25 μm of epoxy and a second coat of approximately 30 μm of alkyd (Example 2).

In a variant (Example 3), the mirrors are covered not with a Levis paint but with Merckens paint in two coats of alkyd with a total thickness of approximately 50 μm. The two coats of paint were specifically an undercoating of Merckens SK 8055 and the overcoating was Merckens SK 7925. These two coats contain lead. The mirrors are allowed to rest for 5 days to ensure complete curing of the paint layers.

Mirrors manufactured in this way are subjected to CASS accelerated ageing and salt fog tests.

Two Control samples not in accordance with the invention are also subjected to the same tests.

These Control samples are manufactured from sheets of glass as described above, except that the step consisting of activation with PdCl$_2$ followed by rinsing is omitted. This step is replaced by a traditional activation step, by spraying with an ammoniacal solution of silver nitrate.

The results of the ageing tests on the mirrors of Examples 2 and 3 and the Control samples 2 and 3 are as set out in the following TABLE II:

TABLE II

| | CASS test average in μm | Salt fog test average in μm | Density of white specks average number/dm$^2$ |
|---|---|---|---|
| Example 2 | 140 | 30 | 0.7 |
| Control 2 | 170 | 110 | 20 to 50 |
| Example 3 | 100 | <6 | 1.0 |
| Control 3 | 130 | 58 | 20 to 50 |

The "white speck" defect is observed after the two tests. This is a point where the silver coating is coming away locally, accompanied by the formation of agglomerations of silver, which appear as a speck diffusing light. These defects are circular in shape, and the average size is between 40 μm and 80 μm. The "density of white specks" value given above is the average number of white specks per dm$^2$ of glass which are observed after the salt fog test and after the CASS test.

In fact, the number of white specks measured after each of the two tests are generally fairly close to each other. This is probably because this "white specks" defect appears when the mirrors are brought in contact with water (in vapour or liquid phase). The CASS test and salt fog test consist of subjecting the mirror to the action of a mist of an aqueous solution: an aqueous solution of NaCl for the salt fog, an aqueous solution containing sodium chloride, copper (I) chloride and acetic acid in the CASS test. It is therefore not surprising if the number of white specks after each of these tests is relatively similar.

The treatment consisting of the activation of the glass with palladium (II) chloride before silvering according to Examples 2 and 3 therefore reduces the corrosion of the edges of the mirror, compared with a mirror on which the glass has been activated in a conventional manner with ammoniacal silver nitrate. In addition, these mirrors according to Examples 2 and 3 have a very appreciable decrease in the number of white specks after the CASS and salt fog tests. The adhesion of the silver on the glass is therefore greatly improved compared with mirrors on which the glass has been activated in a conventional manner, with silver nitrate.

EXAMPLES 4, 5 AND 6

Mirrors are manufactured as described in Example 2, varying the quantity of palladium chloride sprayed onto the glass. The starting solution containing 6 g of PdCl$_2$/l, with a pH of approximately 1, is diluted to varying extents in the spray manifold as follows:

Example 4: 12 mg PdCl$_2$/l to yield 2.2 mg of PdCl$_2$ per m$^2$ of glass;

Example 5: about 30 mg PdCl$_2$/l to yield 5.6 mg of PdCl$_2$ per m$^2$ of glass; and Example 6: 60 mg PdCl$_2$/l to yield 11 mg of PdCl$_2$ per m$^2$ of glass.

The results of the ageing tests on the mirrors according to these Examples 4, 5 and 6 are as set out in the following TABLE III:

TABLE III

| | CASS test average in μm | Salt fog test average in μm | Density of white specks average number/dm$^2$ |
|---|---|---|---|
| Example 4 | 181 | 60 | 18 |
| Example 5 | 166 | 16 | 1 |
| Example 6 | 163 | 16 | 1 |

The "white speck" defect is observed only after the CASS test. The number of "white specks" after salt fog was not measured.

It is therefore observed that the activation of the glass by spraying with 2.2 mg of PdCl$_2$ per m$^2$ of glass provides a mirror which resists ageing tests relatively well. However, the density of white specks after the CASS test diminishes spectacularly if not 2.2 but 5.6 mg of PdCl$_2$/m$^2$ of glass is sprayed. The spraying of higher quantities of PdCl$_2$ (cf Example 6: 11 mg of PdCl$_2$/m$^2$ of glass) does not afford any significant improvement.

EXAMPLES 7 TO 11 AND CONTROL 4

Mirrors are formed as described in Example 3, by varying the quantity of palladium chloride which is sprayed onto the glass. Initially, the solution contains 6 g PdCl$_2$/l, with a pH of 1. This solution is diluted as set out in the following TABLE IV:

TABLE IV

| EXAMPLE | Solution mg PdCl$_2$/l | Spraying level mg PdCl$_2$/m$^2$ |
|---|---|---|
| Example 7 | 6 | 1.1 |
| Example 8 | 12 | 2.2 |
| Example 9 | 30 | 5.5 |
| Example 10 | 60 | 11 |
| Example 11 | 120 | 22 |

The mirrors which were formed in this manner were subjected to CASS tests and salt fog tests. At the same time a control sample, not according to the present invention, was subjected to the same tests. The control sample was formed from glass sheets as described in Example 3, save that the activation step with $PdCl_2$ was omitted. This step was replaced by a usual activation step by spraying with ammoniacal silver nitrate.

The "white speck" observation is made after the CASS test and after the Salt Fog Test. The results were as set out in TABLES Va and Vb.

TABLE Va

| EXAMPLE | CASS test average in $\mu m$ | White specks average/$dm^2$ |
|---|---|---|
| Control 4 | 124 | 47 |
| Example 7 | 254 | 40 |
| Example 8 | 156 | 24 |
| Example 9 | 101 | 3 |
| Example 10 | 102 | 3 |
| Example 11 | 129 | 2 |

TABLE Vb

| EXAMPLE | Salt fog test average in $\mu m$ | White specks average/$dm^2$ |
|---|---|---|
| Control 4 | 41 | 10 |
| Example 7 | 87 | 41 |
| Example 8 | 52 | 7 |
| Example 9 | 13 | 1 |
| Example 10 | 13 | 1 |
| Example 11 | 5 | 1 |

From these results it is apparent that the activation of the glass by spraying 1.1 or 2.2 mg $PdCl_2/m^2$ of glass results in a mirror which resists the ageing tests relatively well. Furthermore, the density of white specks after the CASS test becomes very low if the level of $PdCl_2$ is increased to 5.5 $mg/m^2$ of glass. Higher levels of $PdCl_2$ (for example as used in Examples 10 and 11) do not lead to a significant further improvement.

EXAMPLES 12 TO 15 AND CONTROL 5

Mirrors are formed as described in Example 3, with the following variations:

Example 12: About 6 mg $PdCl_2/m^2$ is sprayed onto glass, instead of 5.5 mg $PdCl_2/m^2$. The quantity of $PdCl_2$ is also increased to about 6 mg $PdCl_2/m^2$ of glass in Examples 13 to 15.

Example 13: The sensitisation step with stannous chloride is omitted.

Example 14: The activation step with $PdCl_2$ is carried out before the sensitisation step with stannous chloride.

Example 15: The step of protecting the silver coating by treatment with a freshly formed acidified solution of stannous chloride was not carried out. The silvered sheets of glass were directly covered with Merckens paint.

Control 5: Mirrors not according to the invention were formed as described in Example 12 except that the activation step with $PdCl_2$ followed by rinsing is replaced by a traditional activation step, by spraying an ammoniacal solution of silver nitrate.

The mirrors formed according to Examples 12 to 15 and Control 5 were subjected to an accelerated CASS ageing test. Corrosion of the margins and the density of white specks after this test were as set out in the following TABLE VIa:

TABLE VIa

| EXAMPLE | CASS test average in $\mu m$ | White specks average/$dm^2$ |
|---|---|---|
| Control 5 | 395 | 32 |
| Example 12 | 165 | 2 |
| Example 13 | 2700 | * |
| Example 14 | 650 | 46 |
| Example 15 | 3200 | 55 |

*The silver coating was so destroyed at the glass/silver interface that the identification of white specks was not possible.

The mirrors formed according to Examples 12, 13, 14 and 15, and Control 5 are subjected to the Salt Fog Test. The corrosion of the margins and the density of white specks after the Salt Fog Test were as set out in the following TABLE VIb:

TABLE VIb

| EXAMPLE | Salt fog test average in $\mu m$ | White specks average/$dm^2$ |
|---|---|---|
| Control 5 | 70 | 47 |
| Example 12 | 41 | 2 |
| Example 13 | 760 | * |
| Example 14 | 93 | 46 |
| Example 15 | 132 | >125 |

*The silver coating was so destroyed at the glass/silver interface that the identification of white specks was not possible.

It can be seen, by comparison of the results of Examples 12 and 13, that it is important to sensitise the glass before activation with $PdCl_2$. The order of the sensitisation and activation steps is very important: when activation is carried out before sensitisation worse ageing results are achieved (see Example 14). Example 15 shows that it is important to protect the silver coating before painting.

EXAMPLES 16 TO 21

Mirrors are formed as described in Example 2, except that the activation solution is poured over the glass instead of being sprayed. 500 ml of acidified solution is poured over 0.5 $m^2$ of glass. The contact time of the solution on the surface of the sensitised glass is approximately 30 seconds. The following activation solutions were used:

Example 16: an acidified aqueous solution containing 6 mg/l $PdCl_2$. The pH was 3.8

Example 17: an acidified aqueous solution containing 10.0 mg/l $AuCl_3$ (pH=4.1).

Example 18: an acidified aqueous solution containing 10.2 mg/l $PtCl_2$ (pH=4.0).

Example 19: an acidified aqueous solution containing 6.7 mg/l $RuCl_3$ (pH=4.0).

Example 20: an acidified aqueous solution containing 8.1 mg/l $NiCl_2.6H_2O$ (pH 4.3).

Example 21: an acidified aqueous solution containing 3.6 mg/l $CrCl_2$ (pH=4.2).

The mirrors formed in Examples 16 to 21 were subjected to accelerated CASS ageing and salt fog tests. Corrosion of the edges and the density of white specks after these tests were as set out in the following TABLEs VIIa and VIIb:

TABLE VIIa

| EXAMPLE | CASS test average in μm | White specks average/dm² |
|---|---|---|
| Control 6# | 477 | 0 |
| 16 (PdCl₂) | 143 | 7 |
| 17 (AuCl₃) | 262 | 55 |
| 18 (PtCl₂) | 204 | * |
| 19 (RuCl₃) | 187 | 8 |
| 20 (NiCl₂.6H₂O) | 298 | 34 |
| 21 (CrCl₂) | 180 | 3 |

TABLE VIIb

| EXAMPLE | Salt fog test average in μm | White specks average/dm² |
|---|---|---|
| Control 6# | 214 | 0 |
| 16 (PdCl₂) | 53 | 5 |
| 17 (AuCl₃) | 117 | 73 |
| 18 (PtCl₂) | 107 | * |
| 19 (RuCl₃) | 53 | 6 |
| 20 (NiCl₂.6H₂O) | 82 | 46 |
| 21 (CrCl₂) | 39 | 10 |

Control 6 is a mirror similar to Control 1, that is a traditionally formed silver mirror carrying a coating of copper to protect the silver layer.
*The surface of the silver coating showed a number of aligned faults indicating seperation of the silver.

It can be seen that all the salts used for the activation solutions used in Examples 16 to 21 give improved results from the point of view of marginal corrosion following the CASS test compared with traditionally produced mirrors carrying a coating of copper. Best results were obtained with Pd (II), Cr (II), and Ru (III).

EXAMPLES 22 TO 24

Example 3 was followed except that in Example 22 the two coats of paint were specifically an undercoating of Merckens SK9085 (a lead-containing paint in which the lead is in the form of lead oxide) and the overcoating was Merckens SK8950 (lead-free). The results obtained were compared with a modification (Example 23) in which the undercoating was Merckens SK9135 (a lead-containing paint in which the lead is present in the form of oxide) and the overcoating was Merckens SK8950 (lead-free) and in a second modification (Example 24) in which the undercoating was Merckens SK8055 (a lead-containing paint in which the lead is present in the form of carbonate, sulphate and oxide) and the overcoating was Merckens SK8950. The results of the tests on the products obtained are set out in the following TABLE VIIIa and VIIb:

TABLE VIIIa

| EXAMPLE | CASS test average in μm | White specks average/dm² |
|---|---|---|
| Example 22 | 164 | 1 |
| Example 23 | 85 | 0 |
| Example 24 | 118 | 2 |

TABLE VIIIb

| EXAMPLE | Salt fog test average in μm | White specks average/dm² |
|---|---|---|
| Example 22 | 19 | 0.5 |
| Example 23 | 22 | 0 |
| Example 24 | 22 | 0.5 |

EXAMPLES 25 TO 27

The procedure of Example 2 was followed except that the activating solution was acidified with various different amounts of hydrochloric acid to give dilute solutions (i.e. solutions sprayed on the glass) with different pHs. The samples obtained were tested with the CASS test and the Salt fog test and were also analyzed to determine the level of palladium deposited on the substrate in the activation step. In the following tables of results (TABLES IXa and IXb), the level of palladium is expressed as the atomic ratio to silicon. The presence of those palladium atoms, and their proportion in relation to the silicon atoms present on the glass may be estimated by an X-ray bombardment technique which causes the ejection of electrons from a surface stratum of the glass. From the X-ray beam energy and the energy of the emitted electrons, it is possible to calculate the binding energy of the electrons so that they may be apportioned between specific electron shells of different atomic species. The atomic ratios of palladium and silicon may then readily be calculated. This analysis is generally realised on the activated glass before silvering and painting. The presence of palladium (or other atom according to the type of activation solution used) may also be analyzed by Secondary Ion Mass Spectroscopy.

TABLE IXa

| Example | Activator (pH ± 0.5) | Pd/Si ratio | CASS test average in μm | White specks average/dm² |
|---|---|---|---|---|
| Example 25 | PdCl₂ (3.5) | 0.12 | 71 | 0 |
| Example 26 | PdCl₂ (4.5) | 0.16 | 65 | 1 |
| Example 27 | PdCl₂ (2.5) | 0.03 | 76 | 2 |

TABLE IXb

| Example | Activator (pH ± 0.5) | Pd/Si ratio | Salt fog test average in μm | White specks average/dm² |
|---|---|---|---|---|
| Example 25 | PdCl₂ (3.5) | 0.12 | 15 | 0.5 |
| Example 26 | PdCl₂ (4.5) | 0.16 | 18 | 0 |
| Example 27 | PdCl₂ (2.5) | 0.03 | 76 | 9 |

These results show that if the pH is low, the level of palladium fixed on the substrate is low and the results are less good. If the pH is higher than 5, a precipitate of palladium hydroxide may result in blockages of the apparatus.

EXAMPLES 28 TO 43

Using the procedure as described in connection with Examples 16 to 21, a number of activating solutions were used as follows.

Example 28: acidified aqueous solution containing 10.7 mg/l AuCl₃ (pH=4.6).

Example 29: acidified aqueous solution containing 5.9 mg/l PtCl₂ (pH=3.5)

Example 30: acidified aqueous solution containing 8.2 mg/l $NiCl_2.6H_2O$ (pH=4.6).

Example 31: acidified aqueous solution containing 5.9 mg/l $PdCl_2$ (pH=4.6).

Example 32: acidified aqueous solution containing 5.9 mg/l $PdCl_2$ (pH=4.1).

Example 33: acidified aqueous solution containing 8.3 mg/l $InCl_3$ (pH=4.6).

Example 34: acidified aqueous solution containing 8.3 mg/l $InCl_3$ (pH=4.1).

Example 35: acidified aqueous solution containing 4.4 mg/I $ZnCl_2$ (pH=4.6).

Example 36: acidified aqueous solution containing 4.4 mg/l $ZnCl_2$ (pH=4.1).

Example 37: acidified aqueous solution containing 54.6 mg/l $BiCl_3$ (pH=4.6). Note that $BiCl_3$ is only slightly soluble.

Example 38: acidified aqueous solution containing 54.6 mg/l $BiCl_3$ (pH=3.5).

Example 39: acidified aqueous solution containing 7.8 mg/l $RhCl_3.3H_2O$ (pH=4.6).

Example 40: acidified aqueous solution containing 7.8 mg/l $RhCl_3.3H_2O$ (pH=4.1).

Example 41: acidified aqueous solution containing 5.4 mg/l $VCl_3$ (pH=4.6).

Example 42: acidified aqueous solution containing 5.4 mg/l $VCl_3$ (pH=4.1).

Example 43: acidified aqueous solution containing 5.8 mg/l $TiCl_3$ (pH=4.5).

The mirrors were subjected to the CASS test. Some metal/silicon ratios were estimated on activated glass. The results were as follows.

TABLE X

| Example No | CASS test average in $\mu m$ | White specks average/$dm^2$ | Ratio Me/Si |
|---|---|---|---|
| 28($AuCl_3$ pH = 4.6) | 219 | 1 | 0.03 |
| 29($PtCl_2$ pH = 3.5) | 131 | 20 | 0.007 |
| 30($NiCl_2.6H_2O$ pH = 4.6) | 144 | 19 | 0.028 |
| 31($PdCl_2$ pH = 4.6) | 161 | 1.5 | 0.032 |
| 32($PdCl_2$ pH = 4.1) | 106 | 0 | 0.076 |
| 33($InCl_3$ pH = 4.6) | 127 | 3 | |
| 34($InCl_3$ pH = 4.1) | 123 | 10 | 0.045 |
| 35($ZnCl_2$ pH = 4.6) | 141 | 9 | |
| 36($ZnCl_2$ pH = 4.1) | 126 | 11 | 0.006 |
| 37($BiCl_3$ pH = 4.6) | 155 | 11 | |
| 38($BiCl_3$ pH = 3.5) | 180 | 13 | |
| 39($RhCl_3.3H_2O$ pH = 4.6) | 149 | 29 | |
| 40($RhCl_3.3H_2O$ pH = 4.1) | 167 | 8.5 | 0.016 |
| 41($VCl_3$ pH = 4.6) | 164 | 2 | |
| 42($VCl_3$ pH = 4.1) | 179 | 4.5 | 0.014 |
| 43($TiCl_3$ pH = 4.5) | 256 | 33.5 | 0.012 |

Best results are obtained with the use of $AuCl_3$, $PdCl_2$, $InCl_3$, $VCl_3$: the mirrors exhibit an average number of white specks of less than 5 per $dm^2$. With $ZnCl_2$ or $RhCl_3.3H_2O$, the mirrors exhibit an average number of white specks comprised between 5 and 10 per $dm^2$.

What is claimed is:

1. A mirror comprising a vitreous substrate having a silver coating formed on a surface thereof produced by a process comprising the steps of:

sensitizing the vitreous substrate, activating the vitreous substrate by contacting the vitreous substrate with a solution comprising ions of palladium (II);

contacting the vitreous substrate with a silvering solution so as to form the silver coating, and applying at least one layer of paint over the silvered substrate.

2. A vitreous substrate having a silver coating formed on a surface thereof produced by a process comprising the steps of:

sensitizing the vitreous substrate, activating the vitreous substrate by contacting the vitreous substrate with a solution comprising ions of palladium (II);

spraying the vitreous substrate with a silvering solution so as to form the silver coating, and applying at least one layer of paint over the silvered substrate.

3. A mirror comprising a vitreous substrate carrying a silver coating which is not covered with a protective layer of copper, there being palladium provided at the vitreous substrate, the mirror exhibiting an average number of white specks of less than 10 per $dm^2$, after having been subjected to at least one of the following tests:

(a) a 120 hour accelerated ageing GASS Test;

(b) a 480 hour Salt Fog Test.

4. The mirror according to claim 3, exhibiting an average number of white specks of less than 5 per $dm^2$, after having been subjected to said at least one test.

5. The mirror according to claim 3 exhibiting an average number of white specks of less than 10 per $dm^2$, after having been subjected to both of said tests (a) and (b).

6. The mirror according to claim 5 wherein the same portion of said mirror has been subjected to both of said tests (a) and (b).

7. The mirror according to claim 3 wherein the vitreous substrate is a glass sheet.

8. The mirror according to claim 3 wherein the silver coating layer has a thickness of 70 to 100 nm.

9. The mirror according to claim 3, wherein the mirror is a mirror with no copper layer which comprises:

the vitreous substrate in the form of a glass sheet having a surface, palladium and tin provided at said surface of the glass sheet, the silver coating layer on said surface of the glass sheet, tin present at the surface of the silver coating layer which is adjacent to at least one paint layer covering the silver coating layer, at least one paint layer covering the silver coating layer.

10. A mirror with no copper layer which comprises in the order recited:

a vitreous substrate;

palladium provided at a surface of the vitreous substrate;

a silver coating layer on said surface of the vitreous substrate; and at least one paint layer covering the silver coating layer.

11. The mirror according to claim 10, wherein the palladium is provided as islets at said surface of the vitreous substrate.

12. The mirror according to claim 10 wherein tin is present at the surface of the silver coating layer which is provided adjacent to the at least one paint layer covering the silver coating layer.

13. The mirror according to claim 10, wherein traces of a silane are present at the surface of the silver coating layer which is adjacent to the at least one paint layer.

14. The mirror according to claim 10, wherein tin is present at said surface of the vitreous substrate.

15. The mirror according to claim 10, wherein the at least one layer of paint is substantially lead-free.

16. The mirror according to claim 10, wherein palladium is present at said surface of the vitreous substrate in a quantity of not more than 3.6 mg per square meter.

17. The mirror according to claim 10 wherein the vitreous substrate is a glass sheet.

18. The mirror according to claim 10 wherein the silver coating layer has a thickness of 70 to 100 nm.

19. A mirror with no copper layer which comprises in the order recited:

a vitreous substrate both tin and at least one material selected from the group consisting of bismuth, chromium, gold, indium, nickel, platinum, rhodium, ruthenium, titanium, vanadium and zinc provided at a surface of the vitreous substrate, a silver coating layer on said surface of the substrate, and at least one paint layer covering the silver coating layer.

20. The mirror according to claim 19 wherein the at least one material selected from the group consisting of bismuth, chromium, gold, indium, nickel, platinum, rhodium, ruthenium, titanium, vanadium and zinc is provided as islets at said surface of the vitreous substrate.

21. The mirror according to claim 19 wherein at least one material selected from the group consisting of tin, chromium, titanium, iron, indium, copper and aluminum is present at the surface of the silver coating layer which is adjacent to the at least one paint layer.

22. The mirror according to claim 19, wherein traces of a silane are present at the surface of the silver coating layer which is adjacent to the at least one paint layer.

23. The mirror according to claim 19, wherein tin is present at said surface of the vitreous substrate.

24. The mirror according to claim 19, wherein the at least one layer of paint is substantially lead-free.

25. The mirror according to claim 19 wherein the vitreous substrate is a glass sheet.

26. The mirror according to claim 19 wherein the silver coating layer has a thickness of 70 to 100 nm.

27. A mirror with no copper layer which comprises:

a vitreous substrate in the form of a glass sheet having a surface, palladium and tin provided at said surface of the glass sheet, a silver coating layer on said surface of the glass sheet, tin present at the surface of the silver coating layer which is adjacent to at least one paint layer covering the silver coating layer, at least one paint layer covering the silver coating layer.

28. The mirror according to claim 27 wherein the silver coating has a thickness of 70 to 100 nm.

29. The mirror according to claim 27 wherein traces of a silane are present at the surface of the silver coating layer which is adjacent to the at least one paint layer.

30. The mirror according to claim 27 wherein the at least one layer of paint is substantially lead-free.

31. A mirror with no copper layer which comprises:

a vitreous substrate in the form of a glass sheet having a surface, palladium and tin provided at said surface of the glass sheet, a silver coating layer having a thickness of 70 to 100 nm on said surface of the glass sheet, tin present at the surface of the silver coating layer which is adjacent to at least one paint layer covering the silver coating layer, traces of a silane present at the surface of the silver coating layer which is adjacent to the at least one paint layer, at least one paint layer covering the silver coating layer.

32. The mirror according to claim 31, wherein the at least one layer of paint is substantially lead-free.

* * * * *